United States Patent
Lan et al.

(10) Patent No.: US 7,252,283 B2
(45) Date of Patent: Aug. 7, 2007

(54) PAPER-PICKUP CLUTCH OF AUTOMATIC PAPER-FEEDING DEVICE

(76) Inventors: Chia-Tsui Lan, 2F., No. 17, Ren-ai St., Gueishan Township, Taoyuan County (TW) 333; Ping-Hung Kuo, No.8, Alley 12, Lane 370, Wuchang St., Songshan District, Taipei City (TW) 105

( * ) Notice: Subject to any disclaimer, the term of this patent is extended or adjusted under 35 U.S.C. 154(b) by 62 days.

(21) Appl. No.: 10/964,453

(22) Filed: Oct. 13, 2004

(65) Prior Publication Data

US 2005/0104276 A1    May 19, 2005

(30) Foreign Application Priority Data

Nov. 13, 2003   (TW) ............................. 92131791 A

(51) Int. Cl.
   *B65H 3/00*   (2006.01)
(52) U.S. Cl. .......................... 271/34; 271/18
(58) Field of Classification Search ................. 271/34, 271/114–118, 10.13; 464/45; 192/56.6
See application file for complete search history.

(56) References Cited

U.S. PATENT DOCUMENTS

| | | | | |
|---|---|---|---|---|
| 521,677 | A * | 6/1894 | Smith ........................... | 464/47 |
| 584,483 | A * | 6/1897 | Richards ...................... | 464/45 |
| 1,128,942 | A * | 2/1915 | Brown ..................... | 192/56.55 |
| 1,425,305 | A * | 8/1922 | White ........................... | 464/10 |
| 1,708,378 | A * | 4/1929 | Dale ............................ | 464/18 |
| 2,389,772 | A * | 11/1945 | Gilbert ..................... | 192/70.14 |
| 2,561,830 | A * | 7/1951 | Vanderzee ................... | 464/45 |
| 3,387,503 | A * | 6/1968 | Rychlik ....................... | 74/411 |
| 3,987,687 | A * | 10/1976 | Bland et al. .................. | 74/531 |
| 4,010,831 | A * | 3/1977 | Reuter ....................... | 192/70.2 |
| 4,625,955 | A * | 12/1986 | Snellman et al. .......... | 271/9.11 |
| 4,754,961 | A * | 7/1988 | Tokuda et al. .............. | 271/114 |
| 4,919,243 | A * | 4/1990 | Flotow ..................... | 192/18 R |
| 4,938,466 | A * | 7/1990 | Correa ........................ | 271/107 |
| 4,946,016 | A * | 8/1990 | Torres ........................ | 192/48.2 |
| 5,478,067 | A * | 12/1995 | Requena et al. ........... | 271/3.14 |

(Continued)

OTHER PUBLICATIONS

Sclater, N., Chironis, N.P. (2001). Mechanisms and Mechanical Devices Sourcebook (3rd Edition). (pp. 342-346). McGraw-Hill.*

*Primary Examiner*—Patrick Mackey
*Assistant Examiner*—Jeremy R Severson
(74) *Attorney, Agent, or Firm*—Berkeley Law and Technology Group LLP

(57) ABSTRACT

A paper-pickup clutch of an automatic paper-feeding device includes a clamping member and a clamping-force adjusting member and can be applied to image processors such as printers, copiers or scanners. The automatic paper-feeding device includes a shaft and a paper-pickup mechanism transmitted to picking up paper by the shaft. The paper-pickup clutch provides a bi-directional clutch function by moving the clamping member toward or away from the paper-pickup mechanism with the clamping-force adjusting member in order to adjust the clamping force of the clamping member working on the paper-pickup mechanism to a certain level. With the certain level of clamping force, the paper-pickup mechanism sustains against paper to be fed and self-rotates with the rotation of the shaft in a first direction for feeding paper and rotates with the shaft in a second direction for releasing paper without further changing the state of the paper-pickup clutch.

16 Claims, 4 Drawing Sheets

U.S. PATENT DOCUMENTS

| | | | |
|---|---|---|---|
| 5,775,823 A * | 7/1998 | Bekki et al. | 400/629 |
| 5,842,694 A * | 12/1998 | Brooks et al. | 271/38 |
| 5,966,158 A * | 10/1999 | Ebata et al. | 347/104 |
| 6,089,561 A * | 7/2000 | Marshall et al. | 271/10.03 |
| 6,203,005 B1 * | 3/2001 | Bednarek et al. | 271/121 |
| 6,206,367 B1 * | 3/2001 | Jo | 271/264 |
| 6,352,256 B1 * | 3/2002 | Hsieh | 271/110 |
| 6,540,220 B2 * | 4/2003 | Kuo et al. | 271/118 |
| 6,581,924 B2 * | 6/2003 | Gaarder et al. | 271/114 |
| 6,588,743 B2 * | 7/2003 | Yap | 271/215 |
| 6,616,136 B1 * | 9/2003 | Huang et al. | 271/10.13 |
| 6,666,446 B2 * | 12/2003 | Gaarder et al. | 271/10.04 |
| 6,877,736 B2 * | 4/2005 | Chung | 271/118 |
| 7,004,464 B2 * | 2/2006 | Hattori et al. | 271/258.03 |
| 2001/0028143 A1 * | 10/2001 | Bantle | 271/34 |
| 2003/0080499 A1 * | 5/2003 | Yap | 271/220 |
| 2005/0236764 A1 * | 10/2005 | Saeki et al. | 271/293 |
| 2006/0049572 A1 * | 3/2006 | Miyazawa | 271/121 |
| 2006/0071391 A1 * | 4/2006 | Chelvayohan et al. | 271/10.01 |

* cited by examiner

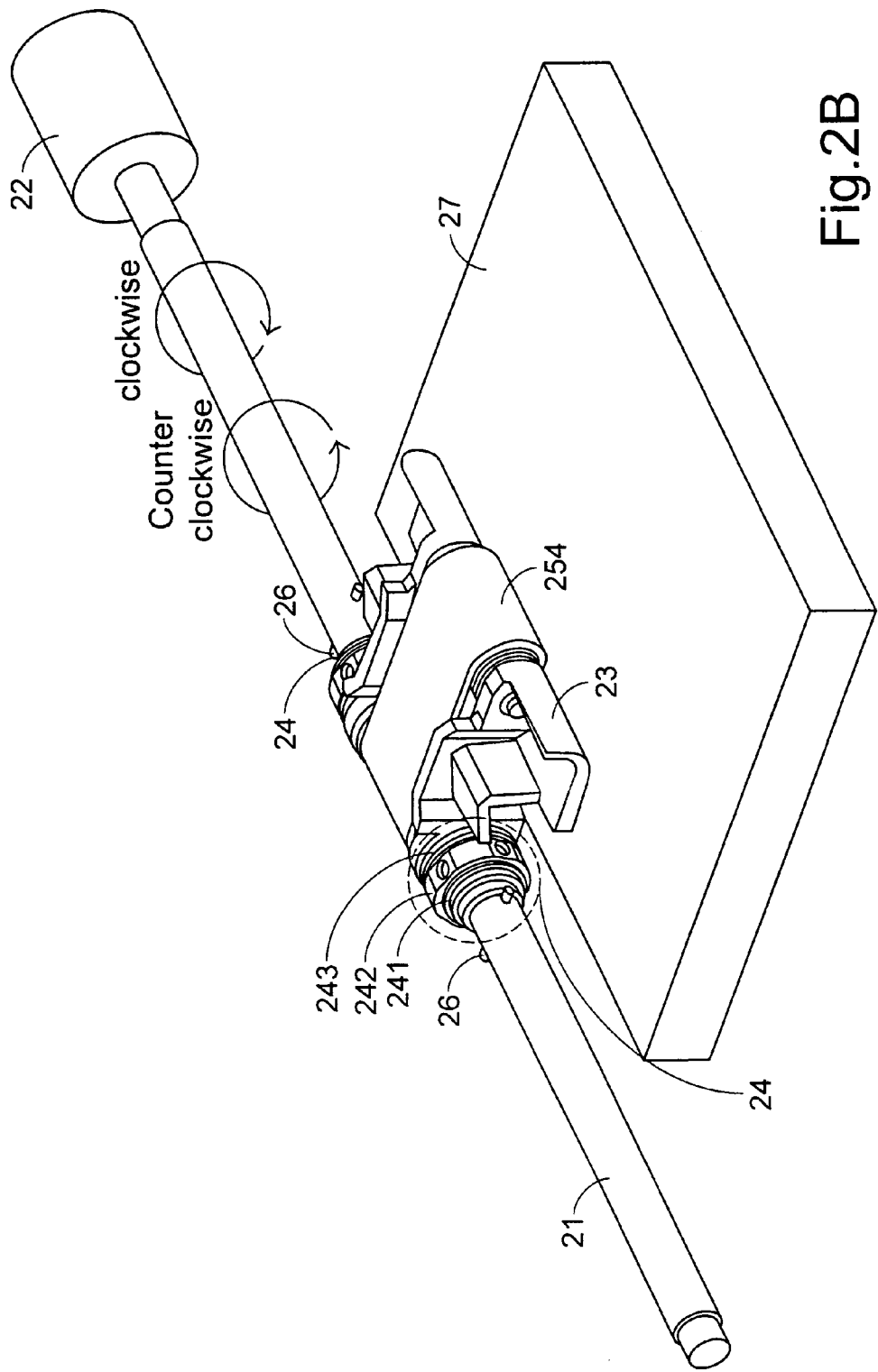

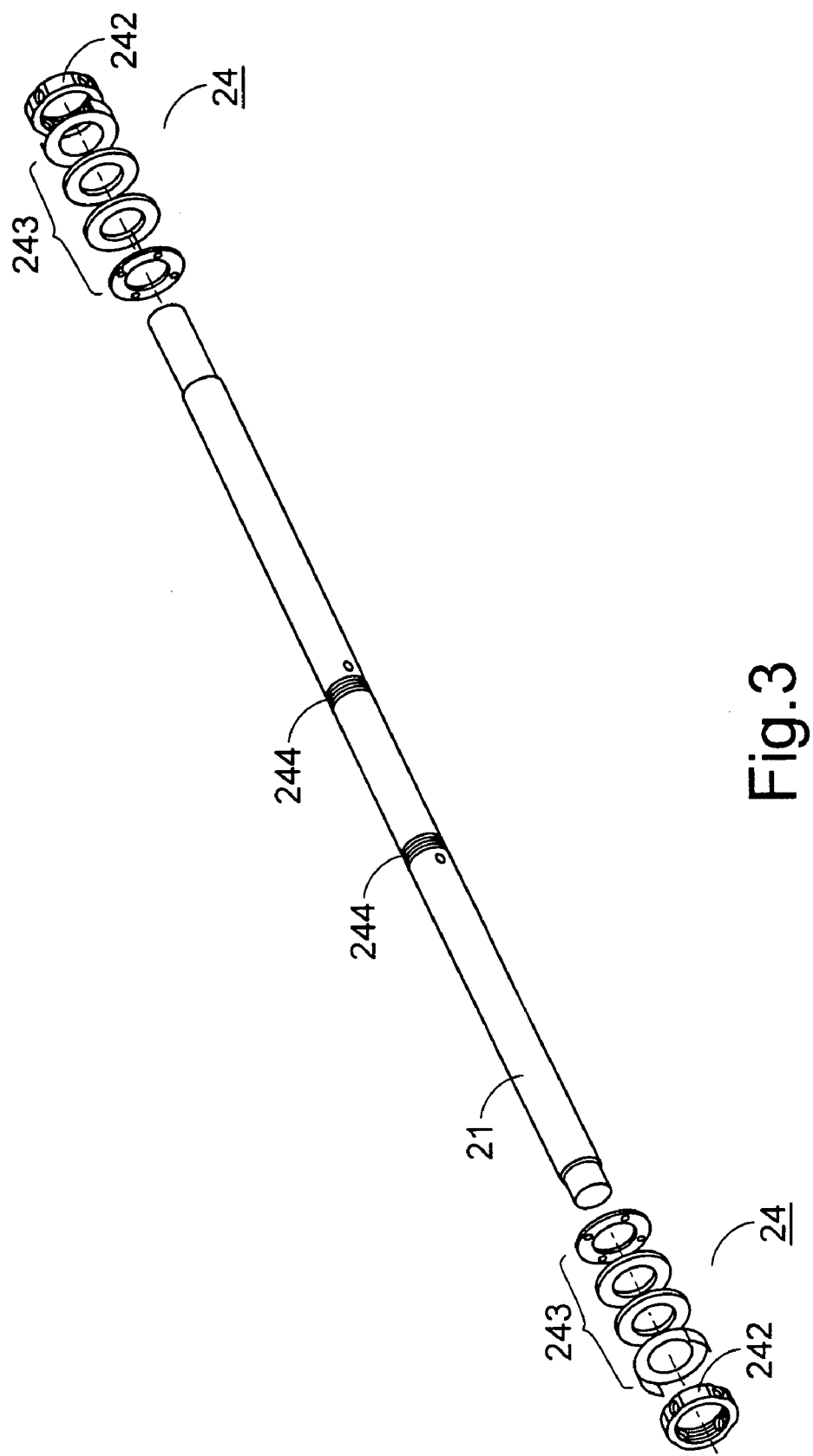

PAPER-PICKUP CLUTCH OF AUTOMATIC PAPER-FEEDING DEVICE

FIELD OF THE INVENTION

The present invention relates to a clutch structure, and more particularly to a paper-pickup clutch of an automatic paper-feeding device. The present invention also relates to an automatic paper-feeding device having an improved paper-pickup clutch means.

BACKGROUND OF THE INVENTION

As the development of image-processing techniques, the image output machines such as printers, copiers, image scanners and multifunctional machines have become more and more popular. Various automatic paper-feeding mechanisms for quickly and steadily feeding paper sheets one by one are thus developed for use with the image output machines to facilitate the image output operations. As understood, the most annoying situation occurring in an automatic paper-feeding device is probably that no paper or more than one sheet of paper is picked in a single feeding operation. It may result in idle feeding or paper stocking problem. Generally, the above situations result from the imbalance between paper pickup and paper release operations. Therefore, it is important to provide an automatic paper-feeding device that has well-controlled paper-feeding mechanism.

Please refer to FIG. 1. A conventional automatic paper-feeding device used in an image processor is schematically shown. In the paper-feeding device, a one-way clutch mechanism is employed. The one-way clutch mechanism is implemented with a shaft 11, a clockwise torsional clutch 121, a counterclockwise torsional clutch 122, a paper-pickup arm 13 and a paper-delivering roller set 14. The paper-delivering roller set 14 includes a first roller 141, a gear set 143 and a second roller 142. The first and second rollers 141 and 142 rest on the paper sheets (not shown) to be fed in a feeding mode. When the first roller 141 is transmitted by and rotates with the shaft 11, the second roller 142 is synchronously transmitted to rotate in the same direction as the first roller 141 via the gear set 143. Then, the rotating first and second rollers 141 and 142 will transmit the paper sheet in contact therewith to move on the condition that the friction force between the rollers 141 and 142 and paper is great enough to inhibit from idle rotation of the rollers. The friction force, on the other hand, should not be so great as to pick up more than one paper sheet at the same time. After the topmost paper sheet is picked up and fed, the paper-delivering roller set 14 is switched from the feeding mode in contact with the topmost paper sheet to a release mode separate from that paper sheet. Meanwhile, the paper-delivering roller set 14 is moved back to pick up and feed next topmost paper sheet.

The aforementioned purposes can be achieved by the clockwise torsional clutch 121 and the counterclockwise torsional clutch 122. The clockwise and counterclockwise torsional clutches 121 and 122, which are implemented with springs, are sleeved on the shaft 11. The clockwise torsional clutch 121 has a fixed end 124 fixed on the shaft 11 and the counterclockwise torsional clutch 122 having a fixed end 125 securely coupled to the paper delivering roller set 14. Between the clockwise torsional clutch 121 and the counterclockwise torsional clutch 122, a coupling member 123 is arranged to couple the above elements to the paper-pickup arm 13. Assuming that the rotation direction of the shaft 11 and the rollers 141 and 142 in the feeding mode is the clockwise direction, the shaft 11 and the rollers 141 and 142 rotate in the counterclockwise direction in the release mode.

When the shaft 11 rotates in the counterclockwise direction, the counterclockwise torsional clutch 122, due to the pulling effect of the fixed end 125, becomes tight on the shaft 11 so as to synchronously move with the shaft 11. Meanwhile, the paper delivering roller set 14 securely coupled to the fixed end 125 of the counterclockwise torsional clutch 122 is transmitted to synchronously rotate with the counterclockwise rotation of the shaft 11 as a whole. The paper delivering roller set 14 thus rotates back to feed next paper sheet.

For feeding a next paper sheet, the shaft 11 is switched to rotate clockwise. Meanwhile, the counterclockwise torsional clutch 122 is released and the clockwise torsional clutch 121 becomes tightened around the shaft 11 because of the pulling force of the fixed end 124 onto the shaft 11. The clamp effect of the clockwise torsional clutch 121 on the shaft 11 transmit the entire the paper delivering roller set 14 to rotate clockwise wit the shaft 11 until the paper delivering roller set 14 sustains against the paper sheets. When the paper delivering roller set 14 has rested on the topmost paper sheet and the shaft 11 keeps rotating clockwise, the paper delivering roller set 14 can not rotate further. Therefore, the continuous clockwise rotation of the shaft 11 overcomes the frictional force between the shaft 11 and the clockwise torsional clutch 121 so as to transmit the rollers 141 and 142 to rotate synchronously, thereby feeding next paper sheet.

The aforementioned paper-pickup mechanism, although capable of achieving the paper picking and feeding purposes, is disadvantageous in manufacturing and maintenance cost and laboring. For example, at least two torsional springs are required to implement the above mechanism. In addition, since the torsion adjustment is the key point for switching the feeding mode and release mode, the control of the torsion-state change is very critical. In other words, the clockwise and counterclockwise torsional clutches 121 and 122 have to be finely manufactured and precisely controlled. Once the long-term or improper use of the springs serving as the clockwise and counterclockwise torsional clutches 121 and 122 result in elastic fatigue or any other damage, the repairing or replacing work of the springs is costly.

SUMMARY OF THE INVENTION

The present invention provides a paper-pickup clutch, which is cost effective and easy to be assembled. Moreover, the paper-pickup clutch can be tuned after the assembling is accomplished to assure of proper clutch control at any time.

A first aspect of the present invention relates to a paper-pickup clutch of an automatic paper-feeding device. The automatic paper-feeding device comprises a shaft and a paper-pickup mechanism sleeved on the shaft. The paper-pickup mechanism sustains against paper to be fed and self-rotating with the rotation of the shaft in a first direction for feeding paper and rotating with the shaft in a second direction for releasing paper. The paper-pickup clutch comprises a clamping member sleeved on the shaft beside the paper-pickup mechanism and exerting a desired level of clamping force on the paper-pickup mechanism for allowing the paper-pickup mechanism to self-rotate with the rotation of the shaft in the first direction after sustaining against the paper to be fed and to rotate with the shaft in the second direction; and a clamping-force adjusting member sleeved on the shaft beside the clamping member and moving the clamping member toward or away from the paper-pickup mechanism in response to an external force in order to adjust the clamping force to the desired level.

Preferably, the clamping member includes two sets of friction discs sleeved on the shaft and disposed at opposite sides of the paper-pickup mechanism. More preferably, each set of the friction discs includes plates that may comprise stainless steel plates and plastic plates which are alternately arranged.

In an embodiment, the clamping-force adjusting member includes a screw coupler securely sleeved on the shaft and a screw nut movably sleeved on the screw coupler and screwed to urge the clamping member against the paper-pickup mechanism to various extents, thereby adjusting the clamping force to the desired level.

In an embodiment, the shaft has a threaded portion and the clamping-force adjusting member includes a screw nut movably sleeved on the thread portion and screwed to urge the clamping member against the paper-pickup mechanism to various extents, thereby adjusting the clamping force to the desired level.

Preferably, the clamping-force adjusting member is confined with two bolts arranged at both sides thereof to avoid dislocation.

According to a second aspect of the present invention, an automatic paper-feeding device comprises a shaft; a paper-pickup mechanism sleeved on the shaft, the paper-pickup mechanism sustaining against paper to be fed and self-rotating with the rotation of the shaft in a first direction for feeding paper and rotating with the shaft in a second direction for releasing paper; and a paper-pickup clutch. The paper-pickup clutch comprises a clamping member sleeved on the shaft beside the paper-pickup mechanism and exerting a desired level of clamping force on the paper-pickup mechanism for allowing the paper-pickup mechanism to self-rotate with the rotation of the shaft in the first direction after sustaining against the paper to be fed and to rotate with the shaft in the second direction; and a clamping-force adjusting member sleeved on the shaft beside the clamping member and moving the clamping member toward or away from the paper-pickup mechanism in response to an external force in order to adjust the clamping force to the desired level.

In an embodiment, the paper-pickup mechanism comprises a base; a first roller coupled to the base and sleeved on and rotating with the shaft; a paper-delivering belt enclosing the base and the first roller and transmitted by the first roller to rotate; and a second roller coupled to the base inside the paper-delivering belt and rotating with the first roller via the transmission of the paper-delivering belt.

For example, the automatic paper-feeding device can be used in a printer, a copier, an image scanner or a multifunctional machine.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2B is a schematic diagram showing the assembly of the automatic paper-feeding device of FIG. 2A;

FIG. 3 is a schematic resolving diagram showing another embodiment of paper-pickup clutch according to the present invention.

DETAILED DESCRIPTION OF THE PREFERRED EMBODIMENT

Figure 1:
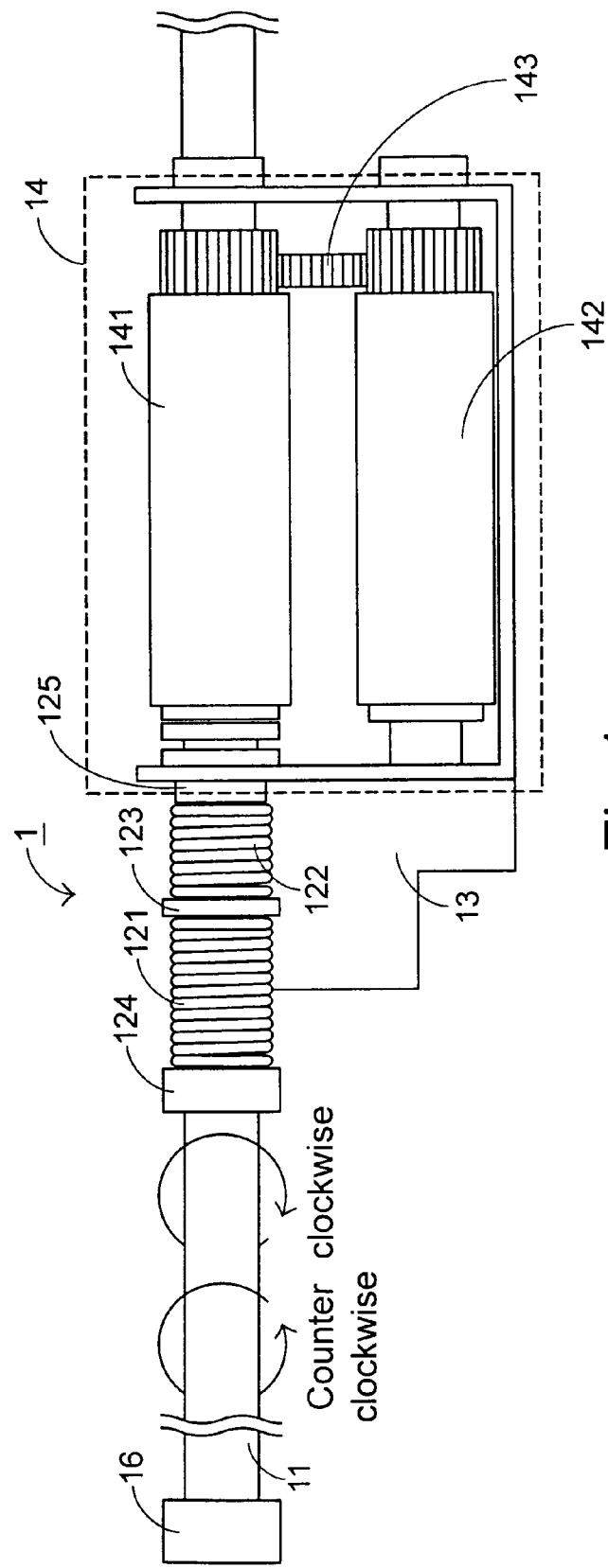
FIG. 1 is a schematic diagram showing a conventional paper-feeding device.
Figure 2A:
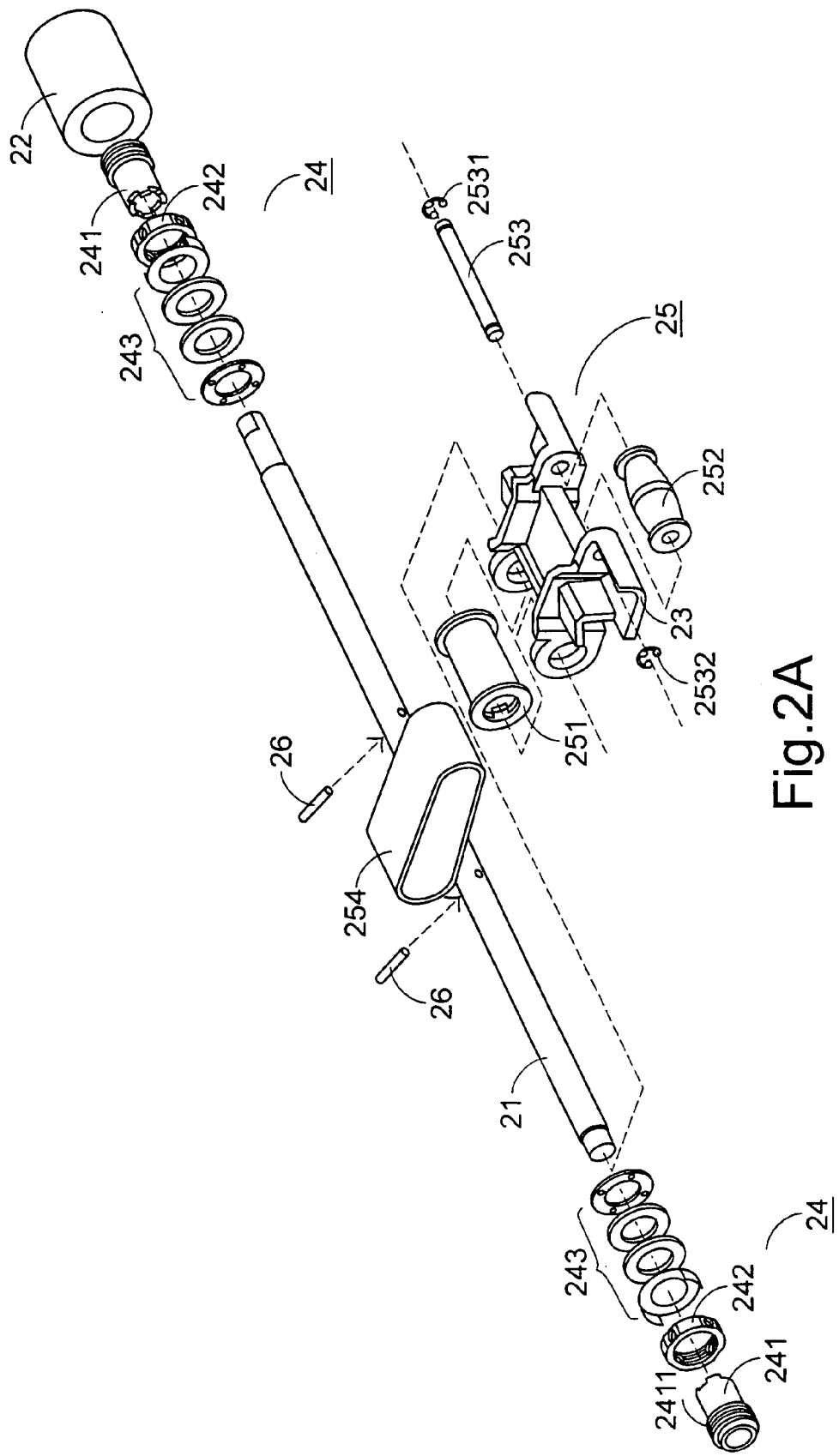
FIG. 2A is a schematic resolving diagram of an automatic paper-feeding device using a paper pick-up clutch according to an embodiment of the present invention.

Please refer to FIGS. 2A and 2B. A paper-feeding device according to an embodiment of the present invention includes a shaft 21, a motor 22, a paper-pickup clutch 24 and a paper-pickup mechanism 25. The shaft is coupled to the motor 22 and driven to rotate by the motor 22. The paper-pickup mechanism 25 includes a base 23, a first roller 251, a second roller 252 and a paper-delivering belt 254. The first roller 251 is coupled to the base 23 and sleeved on the shall 21 along with the base 23. The second roller 252 is coupled to the base 23 via a pin 253 and stopper rings 2531, 2532. The paper-delivering belt 254 encloses the base 23, first roller 251 and second roller 252 therein. Beside the paper-pickup mechanism 25, the paper-pickup clutch 24 is arranged. The paper-pickup clutch 24 includes two sets of friction discs 243 sleeved on the shaft 21 and disposed at opposite sides of the base 23 of the paper-pickup mechanism 25, which serve as a clamping member. Each set of friction discs 243 consists of alternately arranged stainless steel plates and plastic steel plates. The stainless steel plates are used for strengthening the structure of the assembly, and the plastic steel plates provide proper buffering effects. The paper-pickup clutch 24 further includes a clamping-force adjusting member including two screw couplers 241 securely sleeved on the shaft 21 at opposite sides of the paper-pickup mechanism 25 and two screw nuts 242 movably sleeved on the screw couplers 241. In order to avoid dislocation, the screw couplers 241 and screw nuts 242 are confined with two bolts 26 arranged at both sides thereof.

When the shaft 21 is driven by the motor 22 to rotate in for example the clockwise direction, the first roller 251 will rotates with the shaft 21 while transmitting the paper-delivering belt 254 to rotate clockwise. Meanwhile, the second roller 252 is transmitted to rotate with the first roller 251 and paper-delivering belt 254 clockwise so as to cooperate with the other rotating elements to pick up and feed the topmost paper sheet (not shown). For allowing the paper-pickup mechanism 25 to pickup and feed paper smoothly, the clamping force of the clamping member 243 exerted on the paper-pickup mechanism 25 should not bar the rotation of the first roller 251. After the topmost paper sheet is fed, the motor 22 reverses to drive the shaft 21 to rotate counterclockwise, and the paper-pickup mechanism 25 synchronously rotate counterclockwise to rise temporarily. Then, the motor 22 reverses again to put the paper-pickup mechanism 25 down to rest, on next paper sheet to be fed. For raising up the paper-pickup mechanism 25, the clamping force of the clamping member 243 exerted on the paper-pickup mechanism 25 should be great enough to bear with the weight of the paper-pickup mechanism 25.

As mentioned above, the clamping force or friction force between the clamping member 243 and paper-pickup mechanism 25 should be controlled to allow the paper-pickup mechanism 25 to sustain against paper to be fed and self-rotate with the rotation of the shaft 21 clockwise for feeding paper. Also, the clamping force or friction force between the clamping member 243 and paper-pickup mechanism 25 should be controlled to allow the paper-pickup mechanism 25 to rotate with the shaft 21 counterclockwise for releasing paper. For assuring of such critical clamping force all the time, the paper-pickup clutch 24 according to the present invention can be tuned to the optimal level.

By rotating one or both of the screw nuts 242 on respective screw couplers 241 toward the paper-pickup mechanism 25, the frictional discs 243 will be forced to urge against the paper-pickup mechanism 25 in a relatively tight manner. On the other hand, if the screw nuts 242 are rotated to move away from the paper-pickup mechanism 25, the paper-pickup mechanism 25 will be slightly released from the clamping force of the frictional discs 243. In other words, the clamping force can be easily adjusted to a desired level suitable for bi-directional clutch operation by simply rotating the screw nuts 242.

While the invention has been described with reference to various embodiments, it will be understood that these embodiments are illustrative and that the scope of the invention is not limited to them. Many variations, modifications, additions and improvements of the embodiments described are possible. For example, the screw couplers 241 can be substituted by screw couplers 244 formed by directly threading on the shaft 21, as shown in FIG. 3. Likewise, the screw nuts 242 can move on the screw couplers 244 to adjust the clamping force of the clamping member 243. Further, the above embodiment is illustrated with two sets of friction discs and two sets of screwing means arranged at opposite sides of the paper-pickup mechanism. Alternatively, the clamping member and clamping-force adjusting member can be arranged at a single side of the paper-pickup mechanism while the opposite side of the paper-pickup mechanism is confined with a fixed member (not shown). Moreover, the friction discs can be formed of any suitable material in addition to stainless steel and plastic. The count and arrangement of the friction discs can also be freely selected depending on practical factors such as the weight of the paper-pickup mechanism. it is also feasible to have all of the friction discs formed of the same material.

Variations and modifications of the embodiments disclosed herein may be made based on the description set forth herein, without departing from the scope and spirit of the invention as set forth in the following claims.

What is claimed is:

1. A paper-pickup clutch of an automatic paper-feeding device, comprising:
a clamping member sleeved on a shaft beside a paper-pickup mechanism of the automatic paper-feeding device, wherein the clamping member, which does not include a spring element, is capable of exerting a desired level of clamping force on said paper-pickup mechanism and said paper-pickup mechanism is capable of sustaining against paper to be fed and self-rotating with the rotation of said shaft in a first direction to feed the paper and rotating with said shaft in a second direction to release the paper; and
a clamping-force adjusting member sleeved on said shaft beside said clamping member, wherein the clamping-force adjusting member is capable of moving said clamping member toward or away from said paper-pickup mechanism in response to an external force in order to adjust said clamping force to said desired level.

2. The paper-pickup clutch according to claim 1 wherein said clamping member comprises a plurality of friction discs sleeved on said shaft and disposed at opposite sides of said paper-pickup mechanism.

3. The paper-pickup clutch according to claim 2 wherein said plurality of friction discs is selected from a group consisting essentially of stainless steel plates and plastic plates or any combination thereof.

4. The paper-pickup clutch according to claim 3 wherein said stainless steel plates and plastic plates are alternately arranged.

5. The paper-pickup clutch according to claim 1 wherein said clamping-force adjusting member comprises:
a screw coupler securely sleeved on said shaft; and
a screw nut movably sleeved on said screw coupler and capable of being screwed to a plurality of positions on said shaft to urge said clamping member against said paper-pickup mechanism, thereby adjusting said clamping force to said desired level.

6. The paper-pickup clutch according to claim 1 wherein said shaft has a threaded portion and said clamping-force adjusting member comprises a screw nut movably sleeved on said threaded portion and capable of being screwed to a plurality of positions on said shaft to urge said clamping member against said paper-pickup mechanism, thereby adjusting said clamping force to said desired level.

7. The paper-pickup clutch according to claim 1 wherein said clamping-force adjusting member is capable of being confined with two bolts arranged at both sides thereof to avoid dislocation.

8. An automatic paper-feeding device comprising:
a shaft;
a paper-pickup mechanism sleeved on said shaft, said paper-pickup mechanism capable of sustaining against paper to be fed and self-rotating with the rotation of said shaft in a first direction to feed the paper and rotating with said shaft in a second direction to release the paper; and
a paper-pickup clutch comprising:
a clamping member sleeved on said shaft beside said paper-pickup mechanism, wherein the clamping member does not include a spring element and is capable of exerting a desired level of clamping force on said paper-pickup mechanism; and
a clamping-force adjusting member sleeved on said shaft beside said clamping member, wherein the clamping-force adjusting member is capable of moving said clamping member toward or away from said paper-pickup mechanism in response to an external force in order to adjust said clamping force to said desired level.

9. The automatic paper-feeding device according to claim 8 wherein said paper-pickup mechanism comprises:
a base;
a first roller coupled to said base and sleeved on and capable of rotating with said shaft;
a belt enclosing said base and said first roller and transmitted by said first roller to rotate; and
a second roller coupled to said base inside said belt and rotating with said first roller via the transmission of said belt.

10. The automatic paper-feeding device according to claim 8 wherein said clamping member comprises a plurality of friction discs sleeved on said shaft and disposed at opposite sides of said paper-pickup mechanism.

11. The automatic paper-feeding device according to claim 10 wherein the plurality of said friction discs is selected from a group consisting essentially of stainless steel plates and plastic plates or any combination thereof.

12. The automatic paper-feeding device according to claim 11 wherein said stainless steel plates and plastic plates are alternately arranged.

13. The automatic paper-feeding device according to claim 8 wherein said clamping-force adjusting member comprises:
- a screw coupler securely sleeved on said shaft; and
- a screw nut movably sleeved on said screw coupler and capable of being screwed to a plurality of positions on said shaft to urge said clamping member against said paper-pickup mechanism, thereby adjusting said clamping force to said desired level.

14. The automatic paper-feeding device according to claim 8 wherein said shaft has a threaded portion and said clamping-force adjusting member comprises a screw nut movably sleeved on said threaded portion and capable of being screwed to a plurality of positions on said shaft to urge said clamping member against said paper-pickup mechanism, thereby adjusting said clamping force to said desired level.

15. The automatic paper-feeding device according to claim 8 wherein said clamping-force adjusting member is capable of being confined with two bolts arranged at both sides thereof to avoid dislocation.

16. The automatic paper-feeding device according to claim 8 for use in a printer, a copier, an image scanner or a multifunctional machine.

\* \* \* \* \*